(12) United States Patent
Halden et al.

(10) Patent No.: US 10,399,130 B2
(45) Date of Patent: Sep. 3, 2019

(54) METHODS AND SYSTEMS FOR IN SITU TEMPORARY CONTAINMENT OF SHALLOW CONTAMINATED SOILS

(71) Applicants: Arizona Board of Regents on behalf of Arizona State University, Scottsdale, AZ (US); CHEVRON U.S.A. INC., San Ramon, CA (US)

(72) Inventors: Rolf U. Halden, Phoenix, AZ (US); Edward Kavazanjian, Tempe, AZ (US); Alizee M. Jenck, Phoenix, AZ (US); Nasser Hamdan, Scottsdale, AZ (US); Thomas Hoelen, Oakland, CA (US)

(73) Assignees: ARIZONA BOARD OF REGENTS ON BEHALF OF ARIZONA STATE UNIVERSITY, Scottsdale, AZ (US); CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/744,358

(22) PCT Filed: Jul. 18, 2016

(86) PCT No.: PCT/US2016/042836
§ 371 (c)(1),
(2) Date: Jan. 12, 2018

(87) PCT Pub. No.: WO2017/015230
PCT Pub. Date: Jan. 26, 2017

(65) Prior Publication Data
US 2018/0200765 A1    Jul. 19, 2018

Related U.S. Application Data

(60) Provisional application No. 62/195,623, filed on Jul. 22, 2015.

(51) Int. Cl.
*B09C 1/08* (2006.01)
*B09C 1/00* (2006.01)
(Continued)

(52) U.S. Cl.
CPC .................. *B09C 1/08* (2013.01); *B09C 1/00* (2013.01); *C04B 14/104* (2013.01);
(Continued)

(58) Field of Classification Search
CPC . E02D 31/00; E02D 2250/003; E02D 31/006; E02D 2600/20; E02D 31/002;
(Continued)

(56) References Cited

U.S. PATENT DOCUMENTS 4,628,748 A   12/1986   Jogan et al.
4,727,936 A   3/1988    Miuduszewski et al.
(Continued)

FOREIGN PATENT DOCUMENTS

WO   2005076887 A2   8/2005
WO   2008057398 A2   5/2008
(Continued)

OTHER PUBLICATIONS

Andersland, OB; Wiggert, DC; Davies, SH (1996a). Frozen 5 soil subsurface barriers: Formation and ice erosion. Journal of Contaminant Hydrology, 23(1-2):133-147. DOI: 10.1016/0169-7722(95)00096-8.
(Continued)

*Primary Examiner* — Carib A Oquendo
(74) *Attorney, Agent, or Firm* — George A. Leone; Citadel Patent Law

(57) ABSTRACT

A method for installing an in situ, low-permeability temporary horizontal barrier at depth for vertical containment of a soil mass including installing a low permeability vertical barrier having walls located to contain a predetermined soil
(Continued)

volume, the vertical barrier having a horizontal surface area in a plane perpendicular to its walls; and injecting low permeability reagents capable of forming a temporary horizontal barrier in a pattern suitable for creating a horizontal subsurface barrier joined to all of the vertical barrier walls to form an in situ barrier.

16 Claims, 13 Drawing Sheets

(51) Int. Cl.
  *C04B 14/10* (2006.01)
  *C08B 37/00* (2006.01)
  *E02D 31/00* (2006.01)
(52) U.S. Cl.
  CPC ...... *C08B 37/0033* (2013.01); *C08B 37/0096* (2013.01); *E02D 31/002* (2013.01); *B09C 2101/00* (2013.01); *E02D 2250/003* (2013.01); *E02D 2600/20* (2013.01)
(58) Field of Classification Search
  CPC ......... B09C 1/00; B09C 2101/00; B09C 1/08; C04B 14/104; C08B 37/0033; C08B 37/0096
  See application file for complete search history.

(56) References Cited

U.S. PATENT DOCUMENTS

| | | | |
|---|---|---|---|
| 4,804,050 A | 2/1989 | Kerfoot | |
| 5,133,991 A * | 7/1992 | Norman | B09B 1/004 405/129.2 |
| 5,370,478 A * | 12/1994 | Bartlett | B09C 1/00 166/245 |
| 5,591,115 A * | 1/1997 | Raimondi | B09B 1/00 405/129.5 |
| 5,608,137 A | 3/1997 | Wilkins | |
| 5,663,492 A | 9/1997 | Alapati et al. | |
| 5,816,748 A * | 10/1998 | Kleiser | E02D 31/006 405/268 |
| 5,844,147 A | 12/1998 | Fiedler et al. | |
| 5,890,840 A * | 4/1999 | Carter, Jr. | B09B 1/00 37/344 |
| 5,957,624 A * | 9/1999 | Carter, Jr. | E02D 5/18 405/129.6 |
| 5,961,437 A * | 10/1999 | Smith | E02D 31/004 210/901 |
| 6,306,350 B1 | 10/2001 | Mereish et al. | |
| 6,379,560 B1 | 4/2002 | Tilp et al. | |
| 6,649,403 B1 | 11/2003 | McDevitt et al. | |
| 6,863,475 B2 | 3/2005 | DeVaull, III et al. | |
| 8,338,182 B2 | 12/2012 | Halden | |
| 8,691,582 B2 | 4/2014 | Halden | |
| 9,341,609 B2 | 5/2016 | Halden | |
| 2002/0182012 A1 | 12/2002 | Rowe | |
| 2003/0092056 A1 | 5/2003 | Nagasawa | |
| 2003/0153021 A1 | 8/2003 | Lu et al. | |
| 2004/0180334 A1 | 9/2004 | Halden | |
| 2004/0218980 A1* | 11/2004 | Richardson | B09B 1/00 405/129.25 |
| 2007/0161076 A1 | 7/2007 | Halden | |
| 2009/0261261 A1 | 10/2009 | Rodgers | |
| 2012/0219366 A1* | 8/2012 | Landis | E02D 31/004 405/268 |
| 2013/0345990 A1 | 12/2013 | Ziv-El et al. | |
| 2014/0273143 A1 | 9/2014 | Krajmalnik-Brown et al. | |

FOREIGN PATENT DOCUMENTS

| | | |
|---|---|---|
| WO | 2009105241 A1 | 8/2009 |
| WO | 2011011683 | 1/2011 |
| WO | 2011097561 A2 | 8/2011 |
| WO | 2011112540 | 9/2011 |
| WO | 2011140270 A2 | 11/2011 |

OTHER PUBLICATIONS

Andersland, OB; Wiggert, DC; Davies, SH (1996b). Hydraulic conductivity of frozen granular soils. Journal of Environmental Engineering-ASCE. 122(3):212-216. 10 DOI: 10.1061/(ASCE)0733-9372(1996)122:3(212).

Chen-Charpentier, B. and Kojouharov, H.V. (2001). Modeling of subsurface biobarrier formation. Journal of Hazardous Substance Research, 3(1):1-14.

Chen, B.M. and Kojouharov, H.V. (1999). Non-standard numerical methods 15 applied to subsurface biobarrier formation models in porous media. Bulletin of Mathematical Biology, 61(4):779-798.

Dash, J. G. (1991). Ice Technology for Hazardous Waste Management. Waste Management, 11(4):183-190. DOI: 10.1016/0956-053X(91)90066-E.

Fall, M.; Celestin, J. C.; Han, F. S. (2009). Suitability of bentonite-paste tailings 20 mixtures as engineering barrier material for mine waste containment facilities. Minerals Engineering 22(9-10):840-848. DOI:10.1016/j.mineng.2009.02.011.

International Atomic Energy Agency. (2006). Remediation of sites with mixed contamination of radioactive and other hazardous substances. Technical Reports Series ISSN 0074-1914; No. 442.

Komlos, J., Cunningham, A.B., Warwood, B., and James, G. (1998). Biofilm barrier formation and persistence in variable saturated zones. Proceedings of the 1998 Conference on Hazardous Waste Research, 200-208.

Liu, Y.; Gates, W. P.; Bouazza, A. (2013). Acid induced degradation of the bentonite component used in geosynthetic clay liners. Geotextiles and Geomembranes. 36(71-80). DOI: 10.1016/j.geotexmem.2012.10.011.

McCauley, CA; White, DM; Lilly, MR; et al. (2002). A comparison of hydraulic conductivities, permeabilities and infiltration rates in frozen and unfrozen 5 soils. Cold Regions Science and Technology, 34(2):117-125. DOI: 10.1016/S0165-232X(01)00064-7.

Mosavat, N.; Nalbantoglu, Z. (2013). The impact of hazardous waste leachate on performance of clay liners. Waste Management & Research, 31(2):194-202. 10 DOI:10.1177/0734242X12467395.

Parsons (2004). Principles and practices of enhanced anaerobic bioremediation of chlorinated solvents.

Smyth, D., Jowett, R., and Gamble, M. (1997). Sealable joint steel sheet piling for groundwater control and remediation. International Containment 15 Technology Conference, St. Petersburg, Florida, Feb. 9-12.

Tumeo, MA; Davidson, B (1993). Hydrocarbon Exclusion From Ground-Water During Freezing. Journal of Environmental Engineering-ASCE. 119(4):715724. DOI: 10.1061/(ASCE)0733-9372(1993)119:4(715).

International Application No. PCT/US16/42836, International Search Report, dated Dec. 28, 2016.

Canosa, P. et al., "Optimization of solid-phase microextraction conditions for the determination of triclosan and possible related compounds in water samples", Journal of Chromatography A, Apr. 2005 (available online Dec. 2004), 1072, pp. 107-115.

Carr, C. et al., "Effect of Dechlorinating Bacteria on the Longevity and Composition of PCE-Containing Nonaqueous Phase Liquids under Equilibrium Dissolution Conditions", Environmental Science and Technology, Feb. 2000, 34(6), pp. 1088-1094.

Delgado, A. et al., "Role of bicarbonate as a pH buffer and electron sink in microbial dechlorination of chloroethenes", Microbial Cell Factories, Feb. 2012, 11, pp. 123.

Patent Cooperation Treaty, International Searching Authority, International Preliminary Report on Patentability and Written Opinion for PCT/US2011/023886, 4 pages, report dated Aug. 14, 2012, opinion dated Nov. 1, 2011.

Patent Cooperation Treaty, International Searching Authority, International Preliminary Report on Patentability and Written Opinion for PCT/US2011/035255, 5 pages, report dated Nov. 6, 2012, opinion dated Jan. 17, 2012.

(56) References Cited

OTHER PUBLICATIONS

Patent Cooperation Treaty, International Searching Authority, International Search Report for PCT/US2011/023886, 3 pages, dated Nov. 1, 2011.
Patent Cooperation Treaty, International Searching Authority, International Search Report for PCT/US2011/035255, 3 pages, dated Jan. 17, 2012.
USPTO, Final Office Action for U.S. Appl. No. 13/681,125, notification dated Sep. 19, 2013, 12 pages.
USPTO, Final Office Action for U.S. Appl. No. 13/695,395, notification dated Dec. 10, 2015, 18 pages.
USPTO, Final Office Action for U.S. Appl. No. 13/918,779, notification dated Aug. 19, 2016, 8 pages.
USPTO, Non-Final Office Action for U.S. Appl. No. 12/702,033, notification dated Apr. 12, 2012, 10 pages.
USPTO, Non-Final Office Action for U.S. Appl. No. 13/681,125, notification dated Apr. 8, 2013, 10 pages.
USPTO, Non-Final Office Action for U.S. Appl. No. 13/695,395, notification dated Jul. 8, 2015, 14 pages.
USPTO, Non-Final Office Action for U.S. Appl. No. 13/918,779, notification dated May 12, 2016, 7 pages.
USPTO, Non-Final Office Action for U.S. Appl. No. 14/204,058, notification dated Feb. 21, 2018, 11 pages.
USPTO, Non-Final Office Action for U.S. Appl. No. 14/204,058, notification dated May 11, 2017, 13 pages.
Young, T. et al., "Ab initio and in situ comparison of caffeine, triclosan, and triclocarban as indicators of sewage-derived microbes in surface waters", Environmental Science and Technology, Apr. 2008, 42(9), pp. 3335-3340.

* cited by examiner

| Column | Volume discharged, Q | Length, L (barrier thickness) | Area, A | Headloss, h | Time, t | Permeability, k | | |
|---|---|---|---|---|---|---|---|---|
| [#] | [cm^3] | [cm] | [cm^2] | [cm] | [day] | [cm/day] | [cm/s] |
| 1 | 42 | 0.3 | 20.3 | 1.6 | 3 | 1.5E-02 | 1.8E-07 |
| 2 | 35 | 0.2 | 20.3 | 1.2 | 3 | 9.6E-02 | 1.1E-06 |
| 3 | 23 | 0.4 | 20.3 | 1.8 | 3 | 1.8E-02 | 2.1E-07 |
| 4 | 88 | 0.2 | 20.3 | x | 3 | - | - |
| 5 | 38 | 0.3 | 20.3 | 2.0 | 3 | 9.4E-02 | 1.1E-06 |
| 6 | 74 | 0.5 | 20.3 | x | 3 | - | - |
| 7 | 68 | 1.0 | 20.3 | x | 3 | - | - |
| 8 | 26 | 1.5 | 20.3 | 0.7 | 3 | 9.2E-01 | 1.1E-05 |
| 9 | 36 | 1.5 | 20.3 | 0.2 | 3 | 4.4E+00 | 5.1E-05 |
| 10 | <5 | 1.5 | 20.3 | 0.2 | 3 | 6.2E-01 | 7.1E-06 |
| 11 | 35 | 1.8 | 20.3 | 0.4 | 3 | 2.6E+00 | 3.0E-05 |
| 12 | 24 | 1.9 | 20.3 | 0.2 | 3 | 3.7E+00 | 4.3E-05 |

FIG. 10

| Column | Volume discharged, Q | Length, L (barrier thickness) | Area, A | Headloss, h | Time, t | Permeability, k | |
|---|---|---|---|---|---|---|---|
| [#] | [cm^3] | [cm] | [cm^2] | [cm] | [day] | [cm/day] | [cm/sec] |
| 1 | <5 | 1.7 | 20.3 | x | 3 | - | - |
| 2 | 23 | 1.5 | 20.3 | 2.5 | 3 | 2.3E-01 | 2.6E-06 |
| 3 | <5 | 1.8 | 20.3 | 0.5 | 3 | 3.0E-01 | 3.4E-06 |
| 4 | 82 | 0.3 | 20.3 | x | 3 | - | - |
| 5 | 55 | 0.6 | 20.3 | x | 3 | - | - |
| 6 | 23 | 0.8 | 20.3 | x | 3 | - | - |
| 7 | 30 | 1.0 | 20.3 | x | 3 | - | - |
| 8 | 38 | 1.5 | 20.3 | 0.5 | 3 | 1.9E+00 | 2.2E-05 |
| 9 | 40 | 1.5 | 20.3 | 0.7 | 3 | 1.4E+00 | 1.6E-05 |
| 10 | <5 | 1.5 | 20.3 | 0.3 | 3 | 4.1E-01 | 4.8E-06 |
| 11 | 35 | 1.8 | 20.3 | x | 3 | - | - |
| 12 | 28 | 1.9 | 20.3 | x | 3 | - | - |
| 13 | 20 | 1.5 | 20.3 | 0.6 | 3 | 8.2E-01 | 9.5E-06 |

FIG. 11

METHODS AND SYSTEMS FOR IN SITU TEMPORARY CONTAINMENT OF SHALLOW CONTAMINATED SOILS

TECHNICAL FIELD

The present invention relates to methods and processes for in situ containment and management of shallow soils in applications related to remediation, resource extraction, vapor mitigation, and more. Specifically, the invention is a system for creating a temporary low-permeability barrier in the subsurface using geotechnical soil-mixing practices and bio-inspired mineral precipitation, bentonite admixture, or bio-film growth to reduce hydraulic transmissivity at depth.

BACKGROUND

The development of technical solutions for the temporary in situ containment and management of soils containing recalcitrant heavy hydrocarbons (RHH) or other contamination promises an exceptionally high return-on-investment. Attributes of an ideal in situ delivery strategy (ISDS), here defined as methods and processes for in situ containment and management of shallow impacted soils include: (i) effective, custom-designed (short or long-term) containment of contaminants at shallow depths of 30 ft. or less; (ii) compatibility with a wide range of applications; (iii) easy installation; (iv) easy removal if temporary; (v) economical installation; (vi) acceptability to all stakeholders of contaminated sites.

Successful, engineered solutions to horizontal contaminant transport exist, but in situ vertical containment is more difficult to achieve. While horizontal barriers such as the sheet pilings or slurry walls commonly used in the industry are a cost-effective reliable and proven means of lateral containment of contaminants, water, and treatment agents in soil, there is no counterpart barrier available for vertical containment of contaminants, i.e., downward migration of pollutants to deeper soil layers that are in hydraulic communication with groundwater serving as a potential drinking water resource. This technology gap limits complete isolation of contaminants for in situ treatment, thereby reducing the effectiveness of some soil and groundwater remediation efforts.

Possible solutions for creating a horizontal barrier in situ have been proposed in the literature, but technical challenges remain. Soil improvement methods such as biopolymer and bentonite admixture, augmentation of bacterial growth (e.g., biofilm growth), soil freezing, and calcite precipitation may be viable tools for reducing the hydraulic conductivity of the soil to create a temporary, removable, horizontal barrier in situ. However, an additional challenge with most of these methods is creating a continuous horizontal barrier for combined in situ containment and control for predefined periods of time.

Prior work has established that in situ soil containment is challenging. It is estimated that vertical containment has to provide 98% coverage of the plan area or better in order to arrive at an acceptable technical solution for a typical environmental remediation project (Kavazanjian, 2013). Vertical and horizontal continuity of treatment is a function of the type and quantity of agent used as well as the hydraulic conductivity characteristics (magnitude and vertical and lateral distribution) of the treated soil. Prior work has identified soil freezing as a potential solution that also provides the desirable aspect of barrier temporality (McCauley et al., 2002; Andersland et al., 1996a; Andersland et al., 1996b; Dash, 1991; Tumeo and Davidson, 1993); however, the effectiveness of the soil freezing approach is dependent on the saturation level of the soil, which ideally should be near 100%. The modification of clay properties by chemical agents also has been established as a method for horizontal barrier formation (Liu et al., 2013; Mosavat et al. 2013).

The lateral dispersion of agents injected to achieve containment is difficult to estimate from theory and is known to be highly non-uniform in practice. In addition to the challenge of regulating the spatial aspect of barrier formation, temporal dynamics also are difficult to predict (Chen-Charpentier and Kojouharov, 2001; Chen and Kojouharov, 1999; Komlos et al., 1998).

A few previous studies have examined the performance of potential barrier materials under different groundwater, pressure, soil chemistry, and microbiologic regimes (e.g., McCauley et al., 2002; Andersland et al., 1996a; Andersland et al., 1996b; Dash, 1991; Fall et al. 2009; Tumeo and Davidson, 1993). However, a comprehensive evaluation of promising in situ isolation and treatment methods-simulated in tandem, is lacking.

Thus, there is a clear need for (1) screening temporal horizontal barrier formation methods for effectiveness; (2) characterizing the interactions between in situ isolation and treatment technologies; and (3) evaluating the performance of these coupled systems in situ at a scale relevant and realistic for use at RHH impacted sites. The primary technical barrier that needs to be addressed is construction of a horizontal containment barrier in the subsurface, including selection of appropriate environmentally friendly soil-cementation material and formation of a continuous horizontal barrier. If this method is used in conjunction with applications requiring flushing of the soil volume, the barrier may constitute any form of hydraulic control to capture, contain, collect, or recirculate the liquids above it.

An additional technical barrier is the need, or at least desire, in many situations for the vertical barrier to be temporary, i.e. to restore the ground to its pre-containment condition. This may be necessary or desirable to mitigate the potential for long term impacts to groundwater systems, e.g. to restore recharge to an underlying aquifer via infiltration and percolation of precipitation.

Thus, the present invention provides novel solutions for the deficiencies inherent in systems like those described above. Disclosed herein is a new and long sought technical solution for creating a low-permeability horizontal barrier that will connect with the lower ends of a vertical barrier system to establish the desired in situ containment or control of a soil volume. The systems and methods of the present invention allow various soil-treatment applications to be executed on site without the need for excavation and off-site transport of soils.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A method for installing a temporary in situ, low-permeability horizontal barrier at depth for vertical containment of soil contaminants includes installing a low permeability vertical barrier having a plurality of walls located to contain a predetermined soil volume. The vertical barrier has a horizontal surface area in a plane perpendicular to its walls, and the injection and mixing of permeability-reducing reagents in a grid pattern creates a horizontal subsurface barrier that joins to continuous system of vertical barrier walls to form a continuous in situ barrier. The vertical barriers may also be created with slurry wall excavation, by driving sheet piles with environmental interlocks, or using overlapping high density polyethylene sheets, once the horizontal barrier is formed, or the sides of the horizontal barrier may be extended diagonally to the surface and contain the volume of soil in a bowl-like fashion.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 10 shows detailed results from experimental Run 1.

FIG. 11 shows detailed results from experimental Run 2.

Figure 1:
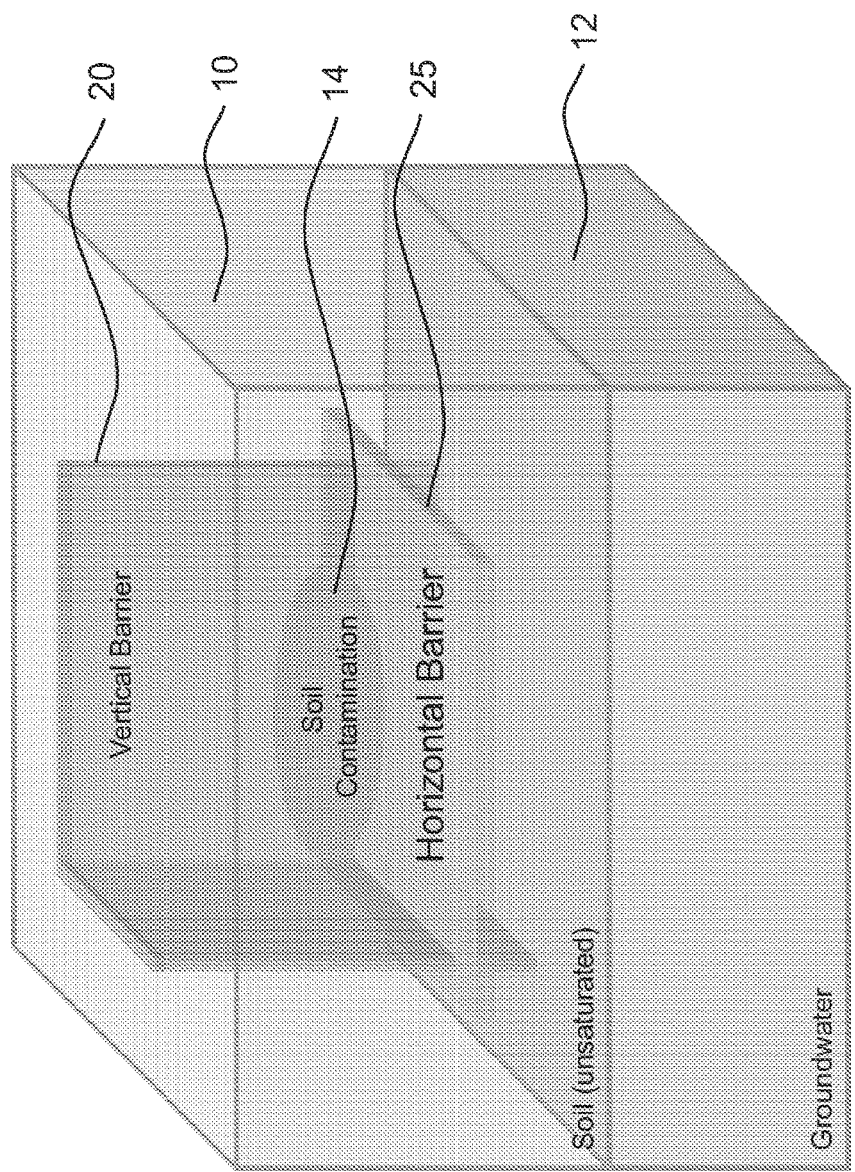
FIG. 1 schematically illustrates a horizontal barrier of custom-designed durability for temporal containment of soil contaminants.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes systems and methods for implementation of a temporary or permanent horizontal containment barrier. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to containment of recalcitrant heavy hydrocarbons in soil. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DEFINITIONS

Generally, as used herein, the following terms have the following meanings when used within the context of contaminant sample collection in soil:

A "sample" as used herein refers to material, such as environmental material obtained from a remediation site that is suspected of containing, or known to contain, contaminants of concern.

"Contaminants" include chemicals and other compounds hazardous to human health such as recalcitrant heavy hydrocarbons and the like.

"In Situ Delivery Strategy" (ISDS) is a supporting technology for the on-site treatment of shallow soils for applications such as remediation or extraction of resources. ISDS provides systems and methods to contain soil and reagents both laterally and vertically to create a control volume in which contaminants and valuable resources can be mobilized and treated without affecting the surrounding environment.

EXAMPLE EMBODIMENTS

Referring now to FIG. 1, a horizontal barrier for containment of soil contaminants is schematically illustrated. A stratified diagrammatic model of a volume of soil 10 is shown. Groundwater 12 typically flows under the layer of soil at various depths depending upon the location. The soil volume 10 contains soil contamination 14 which is typically dispersed throughout the volume. Located within the soil volume is a vertical barrier 20 and a temporary horizontal barrier 25. The horizontal barrier and vertical barrier are structured so as to contain the soil contamination. Note that only partial regions of the temporary vertical barriers are shown here for the purposes of illustration. In actual use the barriers will be structured to surround the soil contamination.

Figure 2:
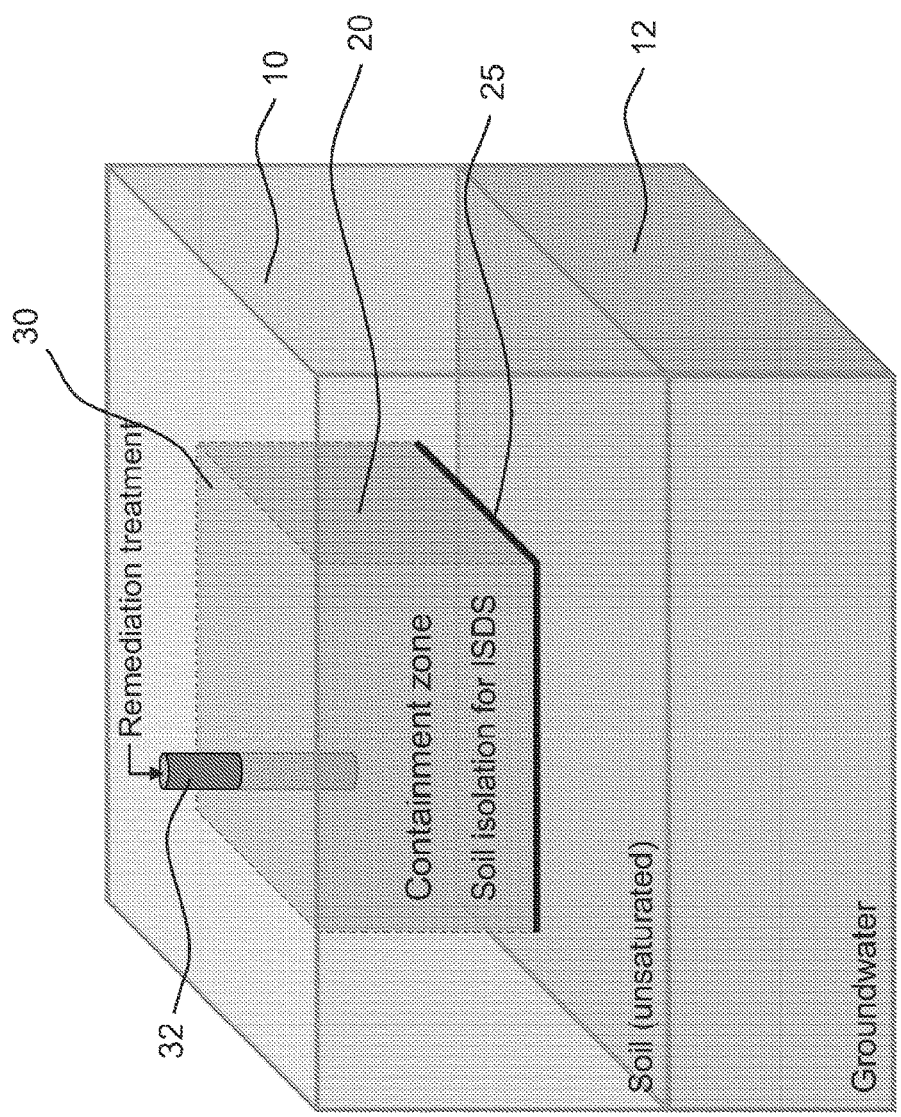
FIG. 2 schematically illustrates an example of applying a remediation treatment to the containment zone using a horizontal barrier for containment of soil contaminants.

Referring now to FIG. 2, an example of applying remediation treatment to containment zone using a temporary horizontal barrier for containment of soil contaminants is schematically illustrated. Shown is a containment zone 30 which is vertically walled in by the vertical barrier 20 and horizontally contained by the temporary horizontal barrier 25. The soil contamination is held within the containment zone so as to be prevented from contaminating the rest of the soil and the groundwater. Once the containment zone is fabricated, remediation treatment can be applied as indicated by remediation conduit 32. Remediation may be implemented in any known manner depending upon the composition of the contaminants, for example, by injection of liquids, gases and/or dissolved remediation agents.

Figure 3:
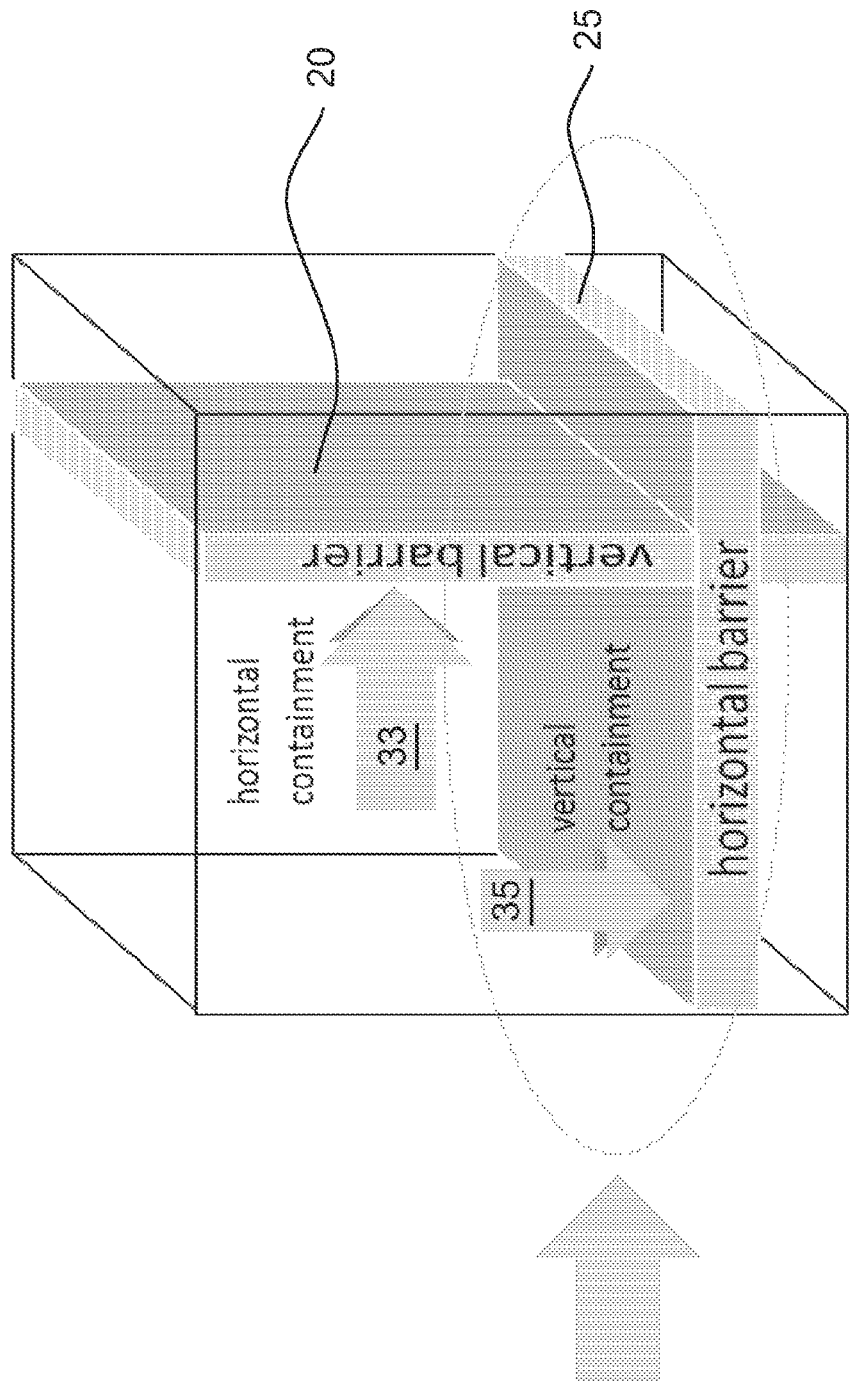
FIG. 3 schematically illustrates a partial view of a horizontal barrier for containment of soil contaminants in cooperation with a vertical barrier.

Referring now to FIG. 3, a partial view of a temporary horizontal barrier for containment of soil contaminants in cooperation with a vertical barrier is schematically illustrated. Once in place the vertical barrier 20 prevents soil contaminants from horizontally penetrating soil bordering the vertical barrier as indicated by directional arrow 33. Similarly, the temporary horizontal barrier 25 prevents soil contaminants from vertically penetrating soil bordering the vertical barrier as indicated by directional arrow 35.

Figure 4:
FIG. 4 diagrammatically illustrates the processes required for field deployment of in Situ Delivery Strategy (ISDS) technology used in conjunction with one embodiment of a horizontal barrier.

Referring now to FIG. 4, the processes required for field deployment of In Situ Delivery Strategy (ISDS) technology used in conjunction with a temporary horizontal barrier is diagrammatically illustrated. In one example of deployment following site characterization, equipment and materials are transported to the target site as by vehicles or other available transportation means (Panels 1-4). Material for forming the temporary horizontal barrier is installed in Panel 5 using vertical or horizontal drilling (as described below). The in situ temporary horizontal barrier is allowed to cure for vertical containment for 3-4 weeks. A predetermined soil volume is laterally contained by installation of the vertical barrier in Panel 6. The sequence of installation of the vertical barriers or walls and the temporary horizontal barrier may be in any order. After installation of the in situ barrier, quality assurance and validation at Panel 7 may be implemented. An optional monitoring system in Panel 8 may be installed. This may be advantageously followed by implementation of remediation technology at Panel 9. Finally, in panel 10 short-term and long-term monitoring of the site is implemented. Those skilled in the art having the benefit of this disclosure will understand how to carry out remediation steps and how to monitor a site for contaminants.

The In Situ Delivery Strategy (ISDS) provides a temporary in situ vessel (control volume) in shallow subsurface environments to enable aggressive and effective manipulation of soils for different applications without the need for excavation and off-site transport.

Development of a means of effective, reversible vertical containment for the reactor is an essential component of the ISDS strategy. Table 1 lays out the potential admixture solutions available for temporary, vertical containment.

TABLE 1

ISDS options for creating a (temporal) horizontal barrier enabling in situ containment and treatment of soil pollution with a target permeability of about $10^{-7}$ to $10^{-6}$ cm/sec.

| Method | Summary |
| --- | --- |
| Bentonite clay admixture | Already being used for containment in various industries, we will look at its potential to create a continuous, horizontal barrier |
| Polymer admixture | For reversibility, employ biodegradable water-repellent polymers, such as Xanthan and Guar gum |
| Enzyme-induced calcite precipitation (EICP) | Reduction in permeability by calcite precipitation using urease enzyme and urea/calcium chloride solution injections |
| Biofilm generation | Stimulate bacteria to generate biofilms that reduce the soil permeability |
| Portland cement & fly ash mixture | Used for confirmation of our delivery system, this cementation mixture works more as a permanent barrier |

EXAMPLES

Laboratory experiments were carried out for an initial determination of the effectiveness of several of the different ISDS barrier options. A first set of ISDS experiments was performed at the laboratory bench scale to determine if a select group of non-toxic, environmentally friendly reagents are able to achieve vertical containment (via a reduction in soil permeability) in a local granular soil in experiments involving small-scale plastic columns. Four admixture solutions were tested in two separate runs containing the following agents: aqueous solutions of sodium bentonite clay, xanthan gum, guar gum, and an aqueous solution for enzyme-induced calcite precipitation (EICP). Permeability values were calculated using the falling head method. Column dimensions, barrier thickness, water head loss, and the volume of water discharged from each column were used to estimate permeability after 3 and 5 days for Run 1 and 2, respectively. Bentonite clay performed the best with respect to a reduction in permeability, achieving permeability values ranging from $1.8 \times 10^{-7}$ to $3.4 \times 10^{-6}$ cm/sec in concentrations varying from 10% to 20% w/v in the aqueous injection fluid used. The EICP admixture solution also attained relatively low permeability values, ranging from $4.8 \times 10^{-6}$ to $7.1 \times 10^{-6}$ cm/sec. The permeability values achieved using guar and xanthan gums were somewhat higher than achieved with the other reagents but may still be satisfactory depending upon the requirements for the containment system.

A second set of experiments involved development of a successful delivery method for field injection of ISDS reagents to create a horizontal subsurface barrier. These experiments were carried-out in five-gallon buckets filled with the same soil used in the small-scale column studies. Full-scale field deployment of the ISDS technology will require an industrial size, large-diameter auger for soil mixing and injection of the permeability-reducing admixture solution in a grid layout, forming overlapping cylinders of treated soil to form a solid, continuous in situ horizontal barrier.

Mechanical mixing using an auger provided an admixture-improved zone of known minimum diameter, location, and thickness. As discussed below, successful application of mechanical mixing requires determination of the appropriate admixtures for reducing the permeability of the mixed soil to the desired value. Strategic placement of a large number of overlapping "soil pucks" can be used to create a continuous layer of low-permeability that can be placed in situ with confidence.

In order to test this technique on a laboratory scale, a small model auger was designed and custom built in ASU's Ira A. Fulton School of Engineering Structural Machine Shop. The model auger was designed to inject and mix a volume of barrier agent solution and create a cylindrical, solid puck measuring at least one-inch in depth and 10 inches in diameter. Functionality of the experimental auger was demonstrated in a 5-gallon bucket featuring a diameter slightly larger than that of the auger. To visibly demonstrate that the auger delivery system was effective, we used a cementation admixture consisting of equal parts of fly ash and Portland cement mixed with water and a plasticizer to stabilize the soil. This cement mixture was used rather than the one of the solutions described above to validate and optimize the delivery method. Use of the cement/fly ash mixture enabled excavation and visual inspection of the soil barrier, revealing a barrier of cylindrical shape created with the auger in situ. In an iterative process, admixture solution injection, excavation and examination of the target zone 1-2 days after injection enabled development of a satisfactory methodology. The ISDS team was successful in creating a cemented, cylindrical puck 10 inches in diameter with a thickness ranging from 1-2.5 inches.

Small-Scale Horizontal Barrier Admixture Solution Screening

Four different admixture solutions with various non-toxic reagents were tested in small-scale, clear plastic columns measuring 10 inches in length and 2 inches in diameter, with one end being capped off (columns and end caps purchased from U-Line, Los Angeles, Calif.). Each admixture solution was tested at three different dosages in two different runs with the exception of one extra column used in Run 2, resulting in 25 columns. The experimental matrix is depicted in Table 2 and includes the number of columns and various dosages used.

Figure 5:
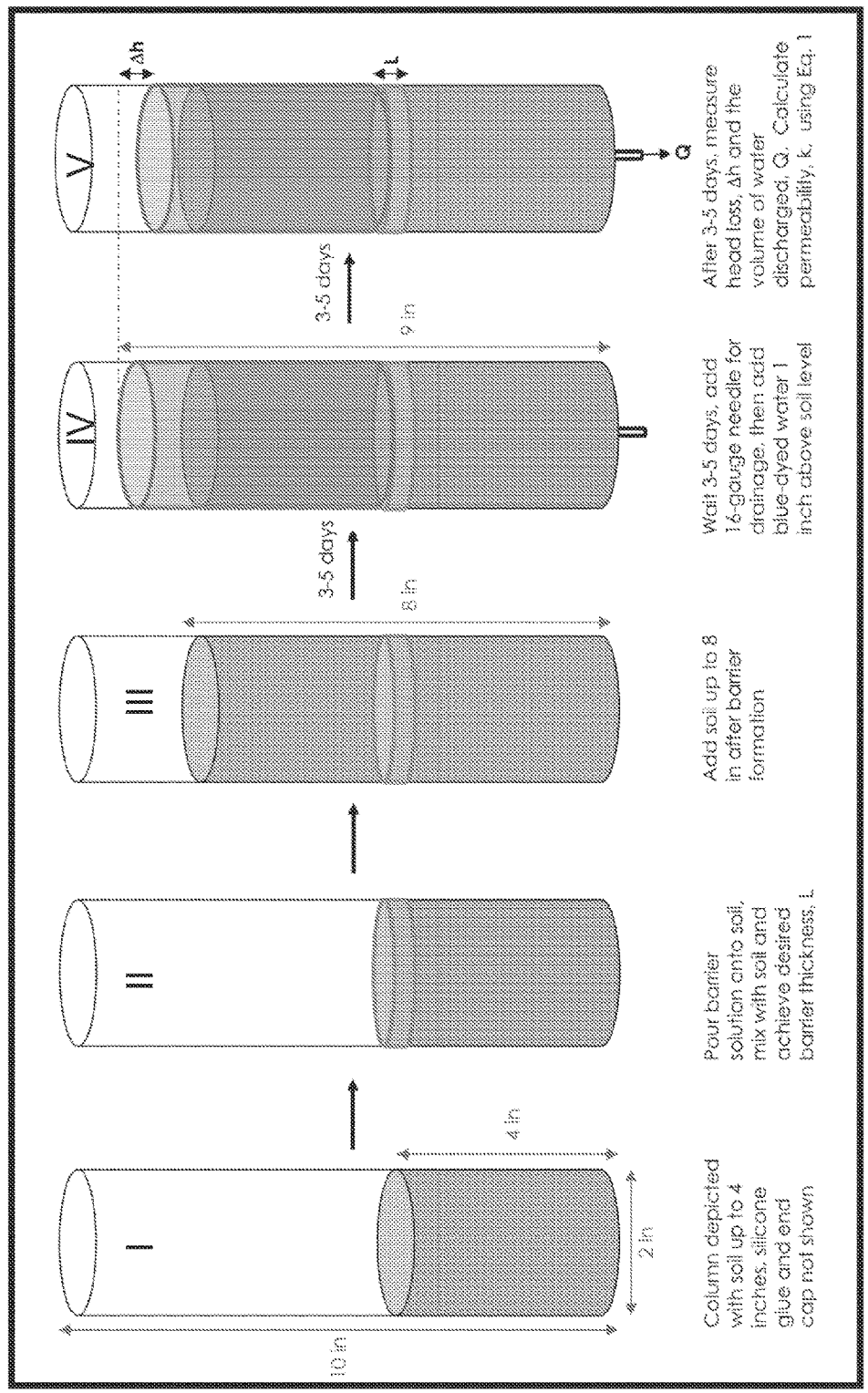
FIG. 5 schematically illustrates an ISDS small-scale experimental setup for a basic permeability test.
Figure 6:
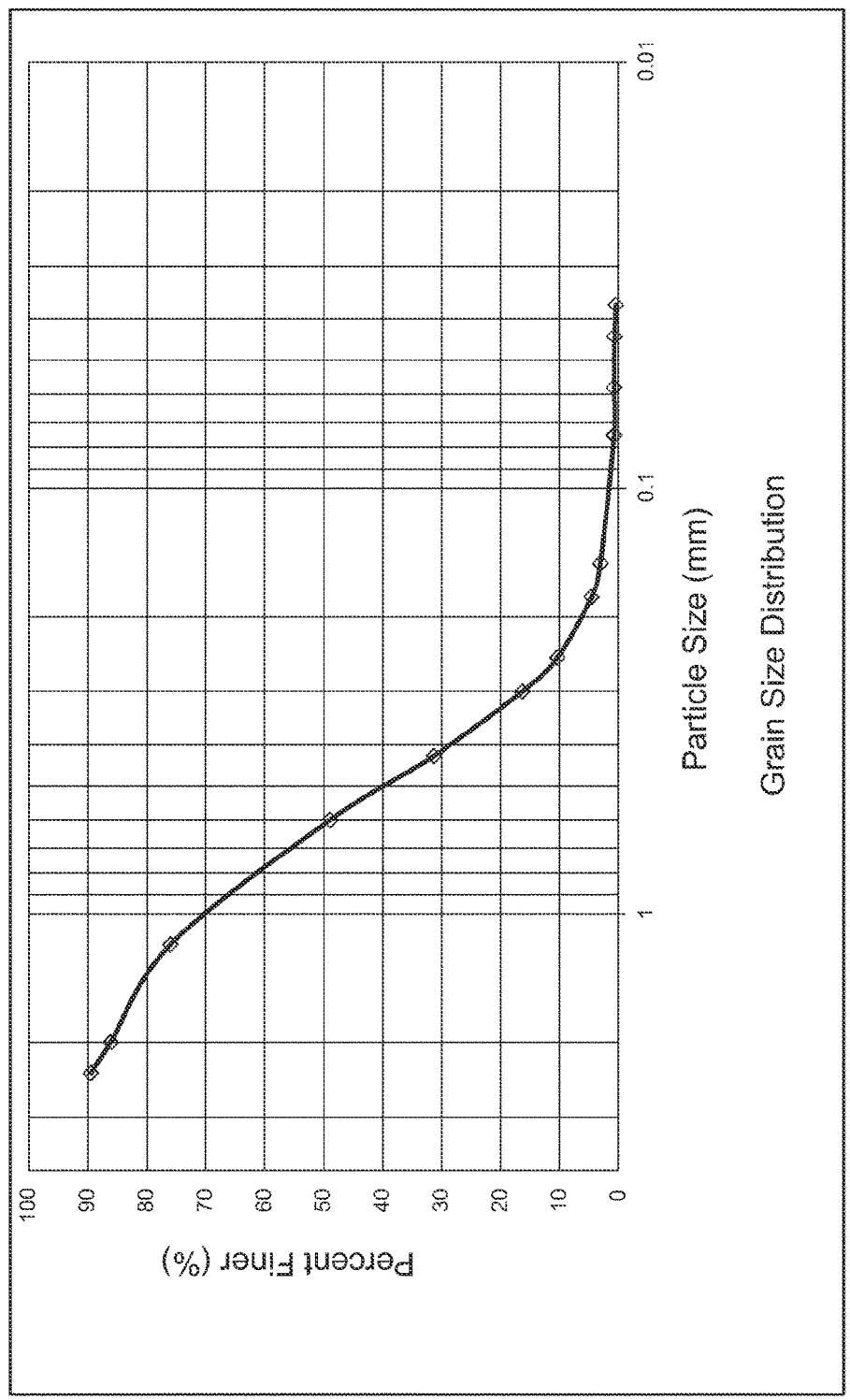
FIG. 6 graphically shows grain size distribution for local Arizona desert soil from ASU Geotechnical Laboratory.

Referring now to FIG. 5, an ISDS small-scale experimental setup for a basic permeability test is schematically illustrated. All columns were filled with a local clean, coarse granular soil from the ASU Geotechnical Laboratory content. To begin Run 1, at stage I the tubes and end caps were rinsed with 99.5% ethyl alcohol (Sigma Aldrich Inc., St. Louis, Mo.). A 1-2 cm thick bead of silicone glue (HD Supply Facilities Maintenance) was placed 4 inches up on the inside of each plastic column in order to minimize space between the column interface and ISDS barrier. The columns were then capped, sealing the end cap with silicone tape (Fisher Scientific, Houston, Tex.). After the glue set for 2-3 hours soil was poured into each column and densified by tapping the bottom of the plastic tube with a heavy, blunt object about 50 times. Soil was added as necessary so that each column had up to 4 inches of soil, approximately 450 g (as shown in FIG. 6). The density of the soil in the bottom half of the columns came out to be $1.92 \pm 0.03$ g/cm$^3$.

For sodium bentonite (Fisher Scientific, Houston, Tex.), xanthan gum (Fisher Scientific, Houston, Tex.), and guar gum (Carolina Biological Supply Co., Burlington, N.C.), 50 mL of solution in weight per volume in tap water was prepared for each dosage specified in Table 2. At stage II, 25-30 mL of the solution was poured into the column to create a horizontal barrier. One-hundred mL of the EICP solution was prepared with the following concentrations in DI water: 0.4 g/L Jack Bean urease enzyme (Sigma Aldrich Inc., St. Louis, Mo.), 1.6 M urea (Sigma Aldrich Inc., St. Louis, Mo.), and 0.8 M calcium chloride dihydrate (G-Biosciences, St. Louis, Mo.) adjusted to pH 8 with a 1.0M sodium hydroxide solution (Sigma Aldrich Inc., St. Louis, Mo.). Column #10, the first EICP column only had 50 mL of the EICP solution, the second (column #11) had 25 mL 10% w/v sodium bentonite followed by 25 mL EICP solu-

TABLE 2

Experimental matrix for small-scale soil columns. Solutions were prepared as aqueous solutions and then mixed into the soil to make a horizontal barrier in the column (also refer to FIG. 1 for additional information on the experimental design).

| Column # | ISDS Stabilization Solution & Dosage | Low | Medium | High | |
|---|---|---|---|---|---|
| 1-3 | Sodium bentonite | 10% w/v | 15% w/v | 20% w/v | |
| 4-6 | Xanthan gum | 0.1% w/v | 0.5% w/v | 1.0% w/v | |
| 7-9 | Guar gum | 0.5% w/v | 1.0% w/v | 3.0% w/v | |
| 10-13 | Enzyme-induced calcite precipitation (EICP) | EICP solution only | 1:1 EICP solution/10% sodium bentonite | 1:3 EICP solution/10% sodium bentonite | (Run 2 only) 1:1 EICP solution/1 |

The small-scale columns for Run 1 and 2 were all prepared in similar fashion for basic permeability testing. Performance of each barrier was evaluated by calculating permeability, k (cm/sec), using Equation 1. This equation is used for constant-head permeability tests and is applicable for these experiments as the head change is quite small. Note that in future large-scale experiments, the falling head test will be used.

$$QL = A\Delta ht \quad \text{Equation 1:}$$

where Q is the volume of water discharged from the column (cm$^3$) after a certain time, t (either 3-5 days in these experiments), h is water head loss (cm) across the soil column, L is barrier thickness (cm), and A is the cross sectional area of the cylinder containing the soil (20.3 cm$^2$).

tion, and the third (column #12) had 30 mL 10% w/v sodium bentonite followed by 10 mL EICP solution.

Once the barrier was in place, at stage III untreated soil was poured up to a height of 8 inches in the column without densification. A 16-gauge needle (Fisher Scientific, Houston, Tex.) was placed through the end cap to allow for drainage. The columns and barriers were left to mature for three days. At stage IV, after three days, water with blue food coloring (Safeway, Tempe, Ariz.) was poured into the column up to the 9-inch mark (FIG. 2). At stage V water head loss, water discharged, and barrier thickness were all measured after three days for permeability calculation. Small beakers and containers were placed underneath each column to catch the discharged water, and volume was determined using mass. If after 3-5 days the water did not stay above the soil level, the column was disqualified and permeability was not calculated. FIG. 3 shows actual images of the process for Run 1 sodium bentonite columns.

Figure 7:
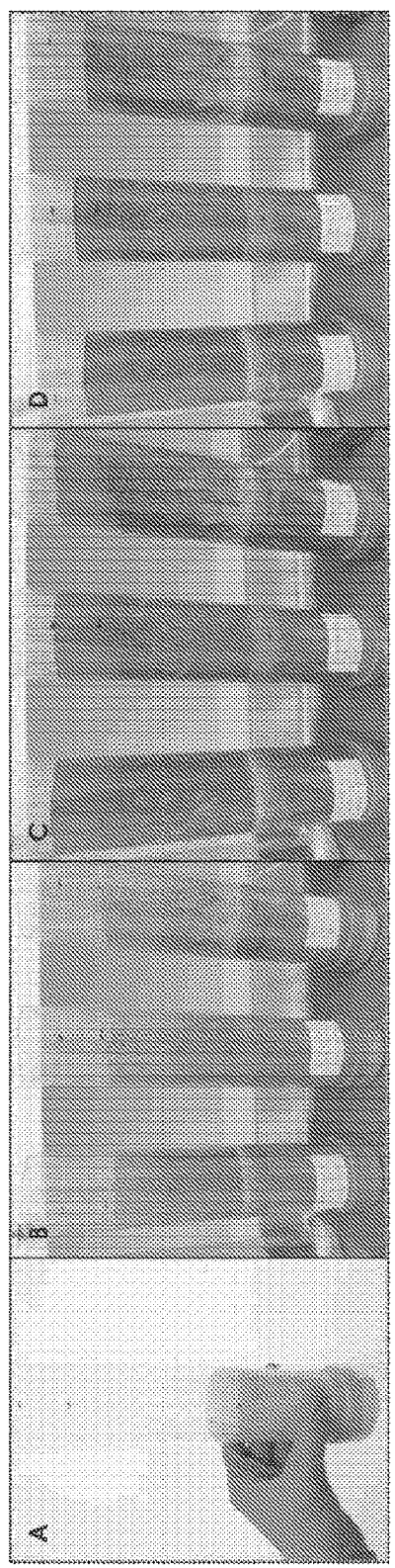
FIG. 7 shows a photo walk-through of the sodium bentonite columns in experimental Run 1.

Referring now to FIG. 7, a pictorial walk-through of the sodium bentonite columns in Run 1 is shown. A. Each column is packed with densified soil (1.92±0.03 g/cm$^3$) up to 4 inches. The silicone glue around the barrier placement location and silicone tape around the end cap is visible. B. Soil is poured on top of the barrier up to the 8-inch mark in the column and barrier thickness is measured. C. After three days of barrier maturation, blue-colored water is poured up to the 9-inch mark. D. After three days, head loss ($\Delta h$) and the volume of water discharge (Q) through the 16-gauge needle were measured. Permeability k was then calculated using equation 1. Detailed Run 1 results are shown in FIG. 10.

In Run 2, columns were prepared in almost exactly the same way as Run 1 with the exception of a few changes to minimize problems with water loss through interface interactions and end cap leakage and to optimize barrier formation. The plastic columns were rinsed with 99.9% acetone (Sigma Aldrich Inc., St. Louis, Mo.) before being rinsed with ethyl alcohol. The inside of the columns was scraped with medium 120-Grit Adalox sand paper (HD Supply Facilities Maintenance). Silicone glue was placed around the silicone tape in addition to around the barrier placement, and was left to cure for at least 48 hours instead of 1-2 hours in Run 1. Barrier thickness was increased to 1-2 cm by preparing and adding more of the barrier admixture solutions, approximately 50 mL in each column. The barriers were given five days to mature before adding blue-colored water to the 9-inch mark, and the head loss and water discharge were measured after an additional five days. An extra column was used for EICP testing, using 25 mL of 1.0% w/v guar gum followed by 25 mL of the EICP solution, bringing the total number of column experiments in Run 2 to 13. Permeabilities were calculated for Run 1 and Run 2; results are given in Results and Discussion. Detailed Run 2 results are shown in FIG. 11.

Intermediate-Scale Admixture Solution Delivery Optimization

Figure 8:
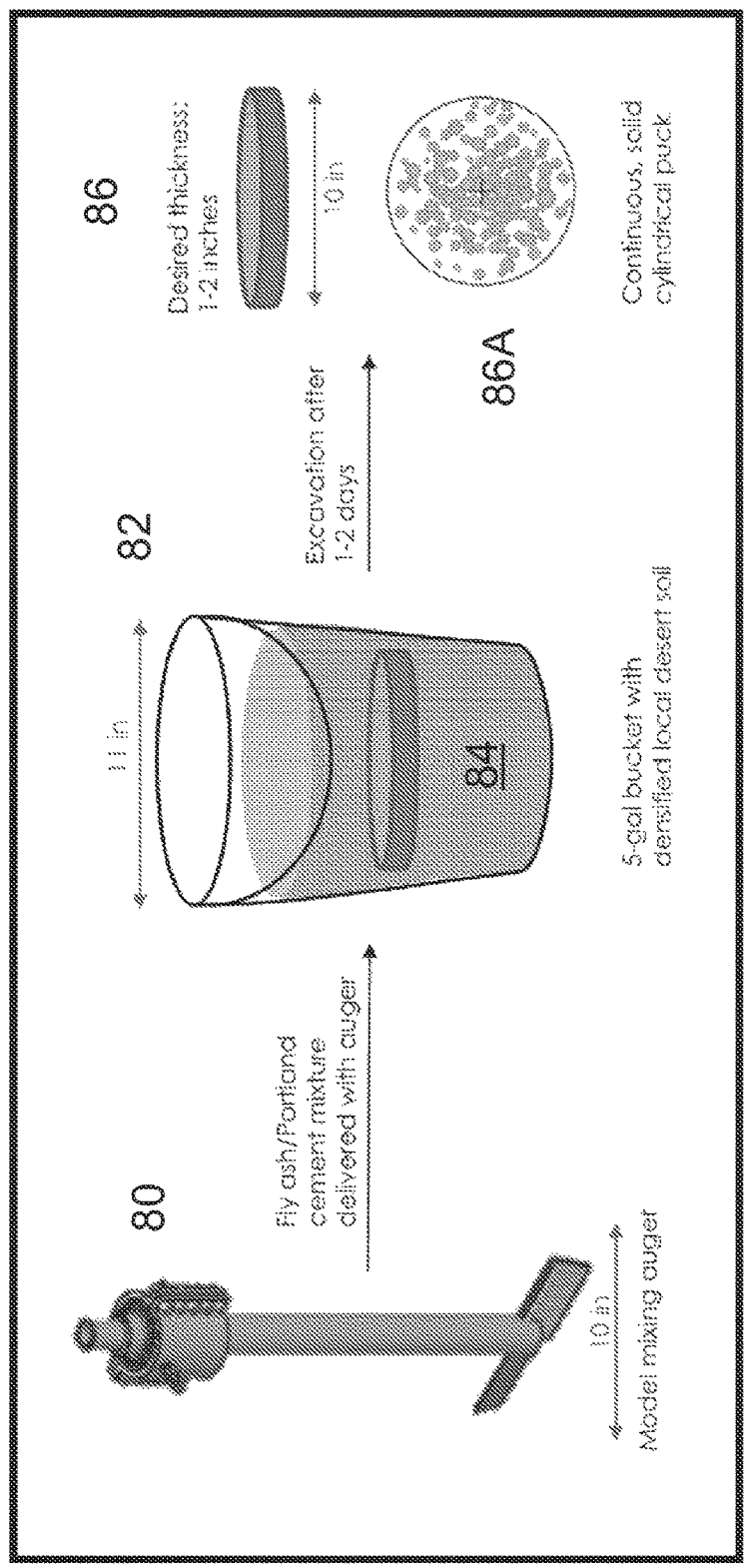
FIG. 8 shows a schematic diagram of the ISDS intermediate-scale delivery experiment using a 1+1 fly ash and Portland cement mixture.
Figure 9:
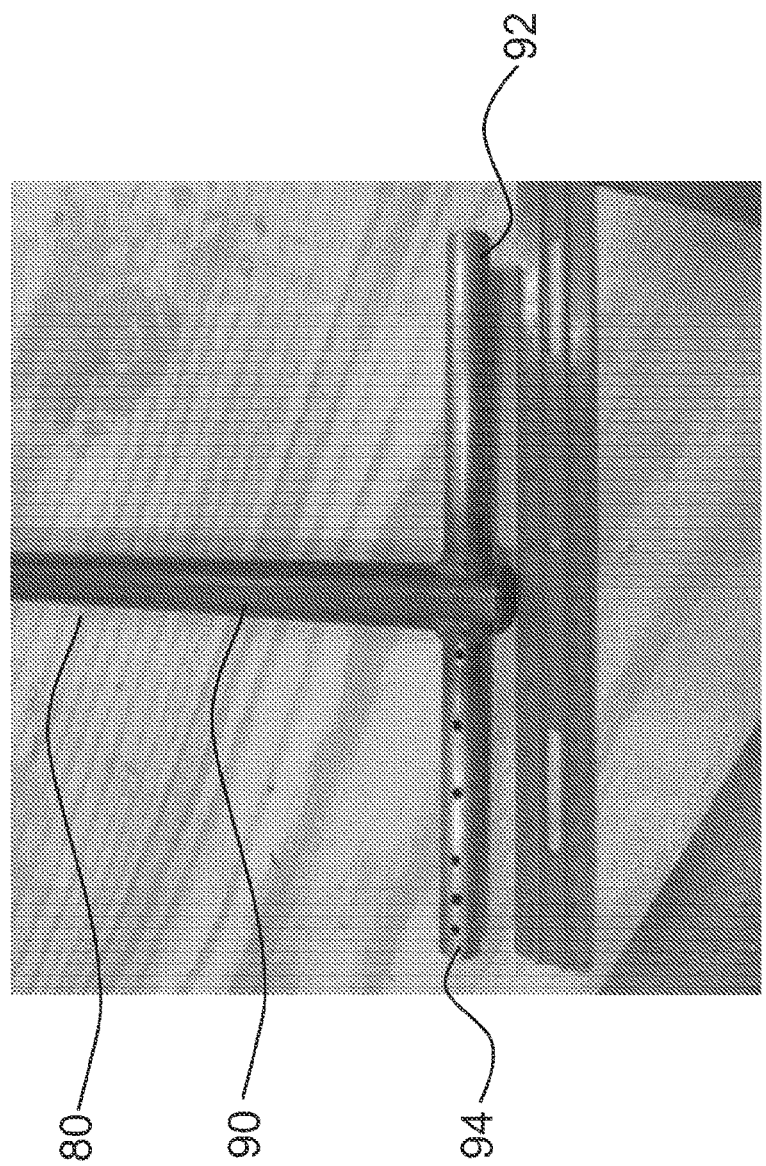
FIG. 9 shows an example of a model mixing auger with a close-up of the delivery tube in the secondary design.

FIG. 8 shows a schematic diagram of the ISDS intermediate-scale delivery experiment using a 1+1 fly ash and Portland cement mixture. Each trial took place in a five-gallon bucket with an approximate diameter of 11 inches to establish the optimal method for creating a single, low-permeability cylindrical inclusion. A model auger 80 was the delivery tool for the injection of a solution containing fly ash and Portland cement (1+1 mixing ratio) in water. The Portland cement-fly ash mixture was diluted to a very low viscosity with water such that the soil zone targeted for admixture received approximately 4-5% (w/w) Portland cement-fly ash by dry weight. In other words, the soil was stabilized using 4-5% by weight Portland cement-fly ash. In each test, the cementation solution was delivered via auger in a Five Gallon Bucket 82 (Home Depot, Tempe, Ariz.) filled with local soil 84 with the intent to create a cylindrical, cement inclusion, or puck 86, 1-2 inches in thickness, featuring a diameter identical to that of the mixing auger, i.e., 10 inches (as best shown in FIG. 9). The puck had a continuous solid surface 86A. The inclusion was excavated no earlier than 24 hours after injection to examine its thickness and continuity, as well as its cylindrical shape and diameter. After the design modification and several attempts at deployment and excavation, the model auger was finally successful in intermediate-scale delivery of a cementation solution.

Small-Scale Horizontal Barrier Admixture Solution Screening

Using Equation 1, permeability (cm/sec) was calculated for each column whose water headloss was measurable above the soil. The results are given in Table 3.

TABLE 3

Permeability results from Run 1 and Run 2 of small-scale screening of ISDS admixture solutions. Note that permeabilities were not calculated if water did not remain above the soil line after 3-5 days.

|  |  |  | Permeability [cm/sec] | |
| --- | --- | --- | --- | --- |
| Dosage | | Column # | Run1 | Run2 |
| Sodium bentonite | Low | 1 | 1.8E−07 | — |
|  | Medium | 2 | 1.1E−06 | 2.6E−06 |
|  | High | 3 | 2.1E−07 | 3.4E−06 |
| Xanthan gum | Low | 4 | — | — |
|  | Medium | 5 | 1.1E−06 | — |
|  | High | 6 | — | — |
| Guar gum | Low | 7 | — | — |
|  | Medium | 8 | 1.1E−05 | 2.2E−05 |
|  | High | 9 | 5.1E−05 | 1.6E−05 |
| EICP | Low | 10 | 7.1E−06 | 4.8E−06 |
|  | Medium | 11 | 3.0E−05 | — |
|  | High | 12 | 4.3E−05 | — |
|  |  | 13 | N/A | 9.5E−06 |

From Table 3, it is clear that sodium bentonite and EICP are the most promising ISDS admixture solutions for the formation of an in situ subsurface barrier capable of vertical containment with regard to achieving a low permeability. Sodium bentonite clay performed the best, having permeability values ranging from $1.8 \times 10^{-7}$ to $3.4 \times 10^{-6}$ cm/sec in concentrations varying from 10% to 20% w/v in the injection solution. The EICP solution alone (low dosage) also attained suitably low permeability values of $4.8 \times 10^{-6}$ and $7.1 \times 10^{-6}$ cm/sec. These values fall between or very close to the desired low-permeability range of $10^{-7}$ to $10^{-6}$ cm/sec, and we are confident in moving forward with one or both admixture solutions for further intermediate- and pilot-scale testing. However, the biopolymers (guar and xanthan gum) may offer the advantage of reversibility, and the permeability achieved using the biopolymers may be sufficiently low for some purposes. The greatest limitation of these results is water loss through insurmountable issues with the column interface, affecting reproducibility and the final permeability values.

Reversibility

All four admixtures offer the potential for reversibility of the horizontal barrier. The permeability of the sodium bentonite-treated soil can be increased several orders of magnitude by percolation a calcium-saturated solution through the barrier, facilitating the transformation of the sodium bentonite to calcium bentonite byisomorphic substitution of sodium ions with calcium ions. The biopolymer admixtures (xanthan gum and guar) will degrade naturally over time. The permeability of the EICP-improved soil can be increased by percolating a weak acid through the barrier to dissolve the precipitated calcium carbonate.

Intermediate-Scale Admixture Solution Delivery Optimization

Referring now to FIG. 9 an example of a model mixing auger with a close-up of the delivery tube in the secondary design is shown. The auger 80 includes a shaft 90 which has an interior channel for introducing ISDS admixture solutions. An opposing pair of distribution tubes 92 are transversely affixed to the shaft and have channels in fluid communication with the interior channels to receive the ISDS admixture solutions. Ports 94 in the distribution tubes horizontally distribute the ISDS admixture solutions when the auger is rotated at a predetermined stratum. Ports 94 are spaced apart and located on opposite sides of each of the opposing pair of distribution tubes 92. Of course this is only a model example and those skilled in the art having the benefit of this disclosure will understand that the auger may have different structures still capable of distributing solutions at a desired stratum. In one useful embodiment the distribution tubes 92 comprised 1 inch-diameter pipes with approximately 0.5 inch-diameter discharge holes drilled along one side of each pipe.

The ISDS team, in collaboration with the ASU Ira Fulton School of Engineering Structural Machine Shop, designed and fabricated a model soil-mixing auger, shown in FIG. 9. This initial design included a 10-inch-diameter auger with two 2-inch tall blades, attached to a 2-inch-diameter hollow center tube. The center tube is approximately 2 feet long and has a rotary union at the top to allow for introduction of an admixture solution, or other aqueous solution, that can be dispersed through discharge tubes attached to the auger blades. During experimental use, the auger blades were to be advanced to the desired depth by rotating the blades and applying a downward force to the center tube. Once the auger reached the desired depth, it would be held at that depth and the n solution discharged (injected) through the tubes attached to the auger blades while continuing to rotate the auger. The auger would be slowly withdrawn while continuing to discharge the admixture solution until the desired thickness of low permeability cylindrical inclusion had been created. In a field application, treatment agents may be injected during withdrawal of the auger. In the field the process would be repeated for a plurality of adjacent locations to cover a predetermined surface area corresponding to the area bordered by the vertical barrier.

Figure 12A:
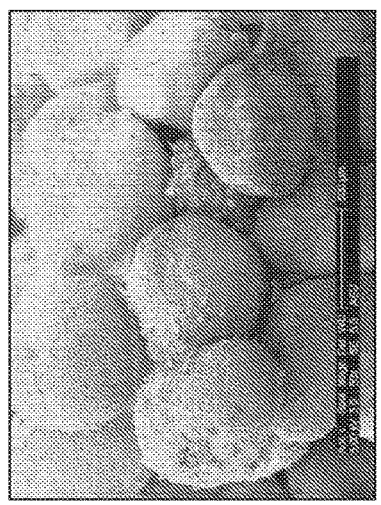
FIG. 12A and FIG. 12B show images of Enzyme-Induced Calcite Precipitation (EICP).
Figure 12B:
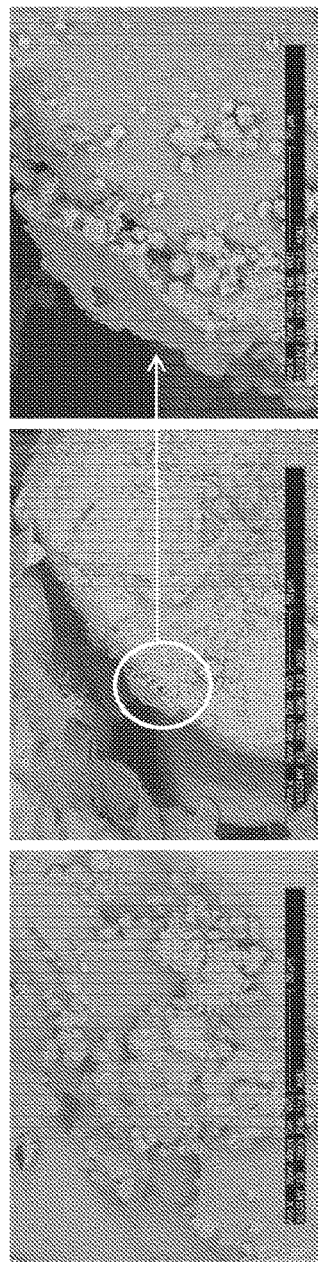

Referring now to FIG. 12A-FIG. 12B, images of Enzyme-Induced Calcite Precipitation (EICP) are shown. As shown in image 102, calcite can form at inter-particle soil contacts 104 and/or fill voids 106. Calcite formed at inter-particle contacts results in cementation to create a low-permeable horizontal barrier.

Figure 13A:
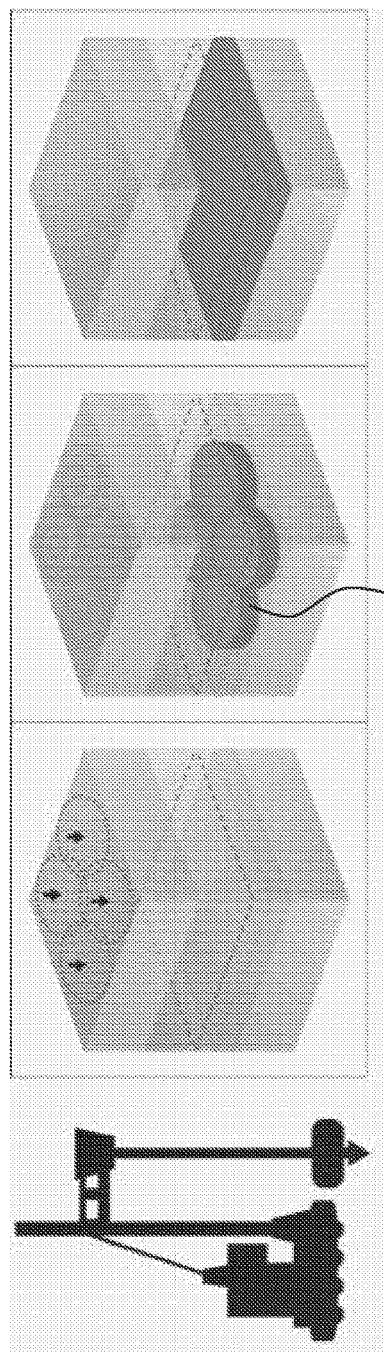
FIGS. 13A and 13B show the vertical drilling and horizontal drilling methods, respectively, for forming a continuous low-permeability barrier in accordance with the present disclosure.
Figure 13A:
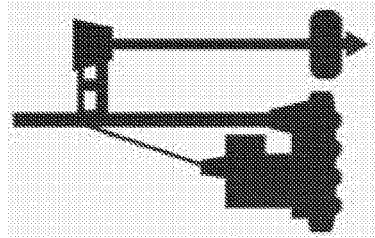
Figure 13B:
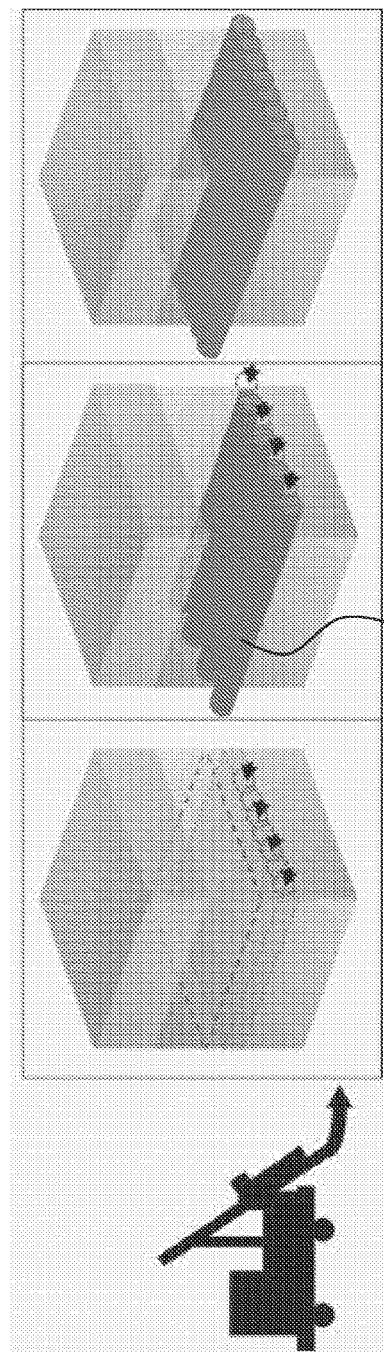
Figure 13B:
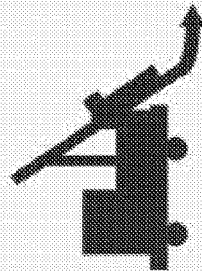

Referring now to FIGS. 13A and 13B, illustrating two methods for installing a temporary horizontal barrier in accordance with the present disclosure is schematically shown. In an advantageous implementation of the systems and methods disclosed herein multiple injections of admixture solution are distributed in a grid layout to create continuous, low-permeability barrier. FIG. 13A shows a plurality of low permeability reagent pucks 200 which have been distributed to overlap in order to form a low permeability barrier. FIG. 13B depicts the directional horizontal drilling method, in which soil-mixed beams 202 are distributed to overlap and form the horizontal barrier.

REFERENCES

The teachings of the following publications are incorporated herein in their entirety by this reference.

Andersland, O B; Wiggert, D C; Davies, S H (1996a). Frozen soil subsurface barriers: Formation and ice erosion. *Journal of Contaminant Hydrology*, 23(1-2):133-147. DOI: 10.1016/0169-7722(95)00096-8.

Andersland, O B; Wiggert, D C; Davies, S H (1996b). Hydraulic conductivity of frozen granular soils. *Journal of Environmental Engineering-ASCE*. 122(3):212-216. DOI: 10.1061/(ASCE)0733-9372(1996)122:3(212).

Chen-Charpentier, B. and Kojouharov, H. V. (2001). Modeling of subsurface biobarrier formation. *Journal of Hazardous Substance Research*, 3(1):1-14. www.engg.ksu.edu/HS_RC/J_HS_R Chen, B. M. and Kojouharov, H. V. (1999). Non-standard numerical methods applied to subsurface biobarrier formation models in porous media. *Bulletin of Mathematical Biology*, 61(4):779-798. link.springer.com Dash, J. G. (1991). Ice Technology For Hazardous Waste Management. *Waste Management*, 11 (4):183-190. DOI: 10.1016/0956-053X(91)90066-E.

Fall, M.; Celestin, J. C.; Han, F. S. (2009). Suitability of bentonite-paste tailings mixtures as engineering barrier material for mine waste containment facilities. *Minerals Engineering* 22(9-10):840-848. DOI:10.1016/j.mineng.2009.02.011.

Halden, R U; Kavazanjian, E.; Jenck, A. M.; Hamden, N. (2015). Methods & Systems for In Situ Temporary Containment of Shallow Soils for Remediation and Resource Extraction. Provisional Patent Application, Arizona Technology Enterprises (AzTE).

International Atomic Energy Agency. (2006). Remediation of sites with mixed contamination of radioactive and other hazardous substances. Technical Reports Series ISSN 0074-1914; No. 442 pub.iaea.ord/MTCD/.

Kavazanjian, E. (2013). Personal communication.

Komlos, J., Cunningham, A. B., Warwood, B., and James, G. (1998). Biofilm barrier formation and persistence in variable saturated zones. *Proceedings of the 1998 Conference on Hazardous Waste Research*, 200-208. endd.ksu.edu/HSRC/98Proceed.

Liu, Y.; Gates, W. P.; Bouazza, A. (2013). Acid induced degradation of the bentonite component used in geosynthetic clay liners. *Geotextiles and Geomembranes*. 36(71-80). DOI: 10.1016/j.geotexmem.2012.10.011.

McCauley, C A; White, D M; Lilly, M R; et al. (2002). A comparison of hydraulic conductivities, permeabilities and infiltration rates in frozen and unfrozen soils. *Cold Regions Science And Technology*, 34(2):117-125. DOI: 10.1016/S0165-232X(01)00064-7.

Mosavat, N.; Nalbantoglu, Z. (2013). The impact of hazardous waste leachate on performance of clay liners. *Waste Management & Research*, 31(2):194-202. DOI: 10.1177/0734242X12467395.

Parsons (2004). Principles and practices of enhanced anaerobic bioremediation of chlorinated solvents.costperformance.org/remediation/.

Smyth, D., Jowett, R., and Gamble, M. (1997). Sealable joint steel sheet piling for groundwater control and remediation. *International Containment Technology Conference*, St. Petersburg, Fla., February 9-12. waterloo-barrier.com Tumeo, M A; Davidson, B (1993). Hydrocarbon Exclusion From Ground-Water During Freezing. *Journal of Environmental Engineering-ASCE*. 119(4):715724. DOI: 10.1061/(ASCE)0733-9372(1993)119:4(715).

What is claimed is:

1. A method for installing an in situ, low-permeability temporary horizontal barrier at a depth for vertical containment of a soil mass, the method comprising:
 installing a low permeability vertical barrier having a plurality of walls located to contain a predetermined soil volume, the vertical barrier having a horizontal surface area in a plane perpendicular to its walls;
 injecting low permeability reagents capable of forming the in situ, low-permeability temporary horizontal barrier in a pattern suitable for creating a horizontal subsurface barrier joined to all of the vertical barrier walls to form the in situ low-permeability barrier; and removing the in situ, low-permeability temporary horizontal barrier through application of a solution capable of dissolving the barrier.

2. The method of claim 1 further comprising implementing quality assurance and validation procedures after installation of the in situ, low-permeability barrier.

3. The method of claim 1 further comprising implementing remediation procedures.

4. The method of claim 1 further comprising site monitoring.

5. The method of claim 1 wherein the horizontal barrier degrades in a predefined duration due to environmental conditions.

6. The method of claim 1 wherein the low permeability reagents capable of forming the in situ, low-permeability temporary horizontal barrier are selected from the group consisting of sodium bentonite, enzyme-induced calcite precipitation, biopolymers, guar, microorganisms, vegetable oil, polysaccharide polymers, and xanthan gum.

7. The method of claim 1 wherein installing the vertical barrier comprises horizontal or direction drilling.

8. A system for installing an in situ, low-permeability temporary horizontal barrier for vertical containment of soil contaminants, the system comprising:

a low permeability vertical barrier having a plurality of walls located to contain a predetermined soil volume, the vertical barrier having a horizontal surface area in a plane perpendicular to its walls;

an injection tool including an injection channel and a plurality of distribution ports for boring into the predetermined soil volume and injecting low permeability reagents capable of forming the in situ, low-permeability temporary horizontal barrier to create a horizontal subsurface barrier joined to all of the vertical barrier walls to form an in situ barrier; and removing the in situ, low-permeability temporary horizontal barrier through application of a solution capable of dissolving the barrier.

9. The system of claim 8 further comprising implementing quality assurance and validation procedures after installation of the in situ, low-permeability temporary horizontal barrier.

10. The system of claim 8 further comprising implementing remediation procedures including the injection and mixing of remediation agents in the treatment zone during placement and/or retrieval of the injection tool.

11. The system of claim 8 further comprising site monitoring.

12. The system of claim 8 wherein the horizontal barrier degrades due to environmental conditions.

13. The system of claim 8 wherein the low permeability reagents capable of forming the in situ, low-permeability temporary horizontal barrier are selected from the group consisting of sodium bentonite, enzyme-induced calcite precipitation, biopolymers, guar and xanthan gum.

14. The system of claim 13 wherein the reagent comprises sodium bentonite having a dosage in solution in the range of 10% w/v to 20% w/v.

15. The system of claim 13 wherein the reagent comprises xanthan gum having a dosage in solution in the range of 0.1% w/v to 1.0% w/v.

16. The system of claim 13 wherein the reagent comprises guar gum having a dosage in solution in the range of 0.5% w/v to 3.0% w/v.

* * * * *